(12) United States Patent
Willshire

(10) Patent No.: US 10,965,627 B2
(45) Date of Patent: Mar. 30, 2021

(54) AUTOMATED CONTACT CENTER CUSTOMER MOBILE DEVICE CLIENT INFRASTRUCTURE TESTING

(71) Applicant: Cyara Solutions Pty Ltd., Hawthorn (AU)

(72) Inventor: Geoff Willshire, Yeronga (AU)

(73) Assignee: CYARA SOLUTIONS PTY LTD, Hawthorn (AU)

(*) Notice: Subject to any disclaimer, the term of this patent is extended or adjusted under 35 U.S.C. 154(b) by 0 days.

(21) Appl. No.: 16/675,191

(22) Filed: Nov. 5, 2019

(65) Prior Publication Data

US 2020/0177530 A1 Jun. 4, 2020

Related U.S. Application Data

(63) Continuation of application No. 15/789,667, filed on Oct. 20, 2017, now Pat. No. 10,469,418, which is a continuation-in-part of application No. 15/613,168, filed on Jun. 3, 2017, now Pat. No. 10,367,764, which is a continuation-in-part of application No. (Continued)

(51) Int. Cl.
| | |
|---|---|
| *H04M 7/00* | (2006.01) |
| *H04M 3/51* | (2006.01) |
| *H04M 3/28* | (2006.01) |
| *H04M 3/32* | (2006.01) |
| *H04L 12/58* | (2006.01) |
| *H04L 12/26* | (2006.01) |
| *G06F 11/36* | (2006.01) |
| *H04L 12/24* | (2006.01) |

(52) U.S. Cl.
CPC ........ *H04L 51/046* (2013.01); *G06F 11/3664* (2013.01); *G06F 11/3684* (2013.01); *G06F 11/3688* (2013.01); *G06F 11/3692* (2013.01); *H04L 41/5038* (2013.01); *H04L 43/50* (2013.01); *H04L 51/02* (2013.01); *H04L 51/14* (2013.01); *H04M 3/28* (2013.01); *H04M 3/323* (2013.01); *H04M 3/5175* (2013.01); *H04M 3/5191* (2013.01); *H04M 7/0045* (2013.01); *H04L 41/00* (2013.01); *H04L 41/14* (2013.01); *H04L 41/5093* (2013.01)

(58) Field of Classification Search
USPC ...................................... 379/265.02
See application file for complete search history.

(56) References Cited

U.S. PATENT DOCUMENTS

| | | | |
|---|---|---|---|
| 6,728,612 B1 * | 4/2004 | Carver ................. | H04L 43/50 701/34.3 |
| 8,566,648 B2 | 10/2013 | Schroeder | |

(Continued)

*Primary Examiner* — Amal S Zenati
(74) *Attorney, Agent, or Firm* — Brian R. Galvin; Galvin Patent Law LLC

(57) ABSTRACT

An automated contact center agent mobile device client infrastructure testing system comprising a mobile device command repository is disclosed. The system also has a mobile device control module that retrieves mobile device commands from the repository, receives instructions, data, and parameters for contact center device testing, runs pre-designated contact center device test suites on at least one mobile device, receives contact center device test suite result data from mobile devices, and forwards the contact center device test suite result data received from mobile devices to a contact center device test manager system.

16 Claims, 9 Drawing Sheets

Related U.S. Application Data

15/491,965, filed on Apr. 19, 2017, now Pat. No. 10,268,571, which is a continuation-in-part of application No. 15/083,259, filed on Mar. 28, 2016, now Pat. No. 10,659,402, which is a continuation-in-part of application No. 14/854,023, filed on Sep. 14, 2015, now abandoned, which is a continuation of application No. 14/141,424, filed on Dec. 27, 2013, now Pat. No. 9,137,184, which is a continuation of application No. 13/936,186, filed on Jul. 6, 2013, now abandoned, which is a continuation-in-part of application No. 13/936,147, filed on Jul. 6, 2013, now abandoned, which is a continuation-in-part of application No. 13/567,089, filed on Aug. 6, 2012, now abandoned, and a continuation-in-part of application No. 12/644,343, filed on Dec. 22, 2009, now Pat. No. 8,625,772, application No. 16/675,191, which is a continuation of application No. 15/789,667, filed on Oct. 20, 2017, now Pat. No. 10,469,418, which is a continuation-in-part of application No. 15/613,168, filed on Jun. 3, 2017, now Pat. No. 10,367,764, which is a continuation-in-part of application No. 15/491,965, filed on Apr. 19, 2017, now Pat. No. 10,268,571, which is a continuation-in-part of application No. 15/083,259, filed on Mar. 28, 2016, now Pat. No. 10,659,402, which is a continuation-in-part of application No. 14/854,023, filed on Sep. 14, 2015, now abandoned, which is a continuation of application No. 14/141,424, filed on Dec. 27, 2013, now Pat. No. 9,137,184, which is a continuation-in-part of application No. 14/140,449, filed on Dec. 24, 2013, now Pat. No. 9,137,183, which is a continuation of application No. 13/936,147, filed on Jul. 6, 2013, now abandoned, which is a continuation-in-part of application No. 13/567,089, filed on Aug. 6, 2012, now abandoned, and a continuation-in-part of application No. 12/644,343, filed on Dec. 22, 2009, now Pat. No. 8,625,772, application No. 16/675,191, which is a continuation of application No. 15/789,667, filed on Oct. 20, 2017, now Pat. No. 10,469,418, which is a continuation-in-part of application No. 15/613,168, filed on Jun. 3, 2017, now Pat. No. 10,367,764, which is a continuation-in-part of application No. 15/491,965, filed on Apr. 19, 2017, now Pat. No. 10,268,571, which is a continuation-in-part of application No. 15/157,384, filed on May 17, 2016, now Pat. No. 10,230,836, which is a continuation of application No. 14/709,252, filed on May 11, 2015, now Pat. No. 9,344,556, which is a continuation of application No. 14/140,470, filed on Dec. 25, 2013, now Pat. No. 9,031,221, which is a continuation of application No. 13/936,183, filed on Jul. 6, 2013, now abandoned, which is a continuation-in-part of application No. 13/567,089, filed on Aug. 6, 2012, now abandoned, and a continuation-in-part of application No. 12/644,343, filed on Dec. 22, 2009, now Pat. No. 8,625,772.

(60) Provisional application No. 62/491,252, filed on Apr. 28, 2017, provisional application No. 62/491,258, filed on Apr. 28, 2017.

(56) References Cited

U.S. PATENT DOCUMENTS

| | | | |
|---|---|---|---|
| 8,625,772 | B2 | 1/2014 | Kulkarni |
| 8,978,014 | B1 | 3/2015 | Larsen et al. |
| 8,990,629 | B2 | 3/2015 | Salame |
| 9,047,410 | B2 | 6/2015 | Markandea et al. |
| 9,195,574 | B1 | 11/2015 | Ryan et al. |
| 9,355,017 | B2 | 5/2016 | Neumeyer |
| 9,563,544 | B2 | 2/2017 | Mecke et al. |
| 9,703,691 | B1 | 7/2017 | Yim et al. |
| 2004/0008825 | A1 | 1/2004 | Seeley et al. |
| 2008/0294690 | A1* | 11/2008 | McClellan ....... G08G 1/096725 |
| 2009/0307763 | A1 | 12/2009 | Rawlins et al. |
| 2013/0179858 | A1* | 7/2013 | Mecke ............ G06F 11/3688 717/106 |
| 2014/0181676 | A1* | 6/2014 | Samborskyy ........ G06Q 10/00 715/736 |
| 2016/0034383 | A1 | 2/2016 | Duan et al. |

* cited by examiner

AUTOMATED CONTACT CENTER CUSTOMER MOBILE DEVICE CLIENT INFRASTRUCTURE TESTING

CROSS-REFERENCE TO RELATED APPLICATIONS

| Application No. | Date Filed | Title |
|---|---|---|
| Current application | Herewith | AUTOMATED CONTACT CENTER CUSTOMER MOBILE DEVICE CLIENT INFRASTRUCTURE TESTING claims priority to, benefit of: |
| 62/491,258 | Apr. 28, 2017 | AUTOMATED CONTACT CENTER AGENT MOBILE DEVICE CLIENT INFRASTRUCTURE TESTING And is also a continuation of: |
| 15/789,667 | Oct. 20, 2017 | AUTOMATED CONTACT CENTER CUSTOMER MOBILE DEVICE CLIENT INFRASTRUCTURE TESTING Which is a continuation-in-part of: |
| 15/613,168 Patent 10,367,764 | Jun. 3, 2017 Issue Date Jul. 30, 2019 | SYSTEM AND METHOD FOR AUTOMATED CONTACT CENTER AGENT MOBILE DEVICE CLIENT INFRASTRUCTURE TESTING Which claims priority to, and benefit of: |
| 62/491,252 | Apr. 28, 2017 | SYSTEM AND METHOD FOR AUTOMATED CONTACT CENTER AGENT MOBILE DEVICE CLIENT INFRASTRUCTURE TESTING And is also a continuation-in-part of: |
| 15/491,965 Patent 10,268,571 | Apr. 19, 2017 Issue Date Apr. 23, 2019 | SYSTEM AND METHOD FOR AUTOMATED THIN CLIENT CONTACT CENTER AGENT DESKTOP TESTING Which is a continuation-in-part of: |
| 15/083,259 | Mar. 28, 2016 | SYSTEM AND METHOD FOR AUTOMATED END-TO-END WEB INTERACTION TESTING Which is a continuation-in-part of: |
| 14/854,023 | Sep. 14, 2015 | SYSTEM AND METHOD FOR AUTOMATED CHAT TESTING Which is a continuation of: |
| 14/141,424 Patent 9,137,184 | Dec. 27, 2013 Issue Date Sep. 15, 2015 | SYSTEM AND METHOD FOR AUTOMATED CHAT TESTING Is a continuation of: |
| 13/936,186 | Jul. 6, 2013 | SYSTEM AND METHOD FOR AUTOMATED CHAT TESTING Which is a continuation-in-part of: |
| 13/936,147 | Jul. 6, 2013 | SYSTEM AND METHOD FOR AUTOMATED CHAT TESTING Which is a continuation-in-part of: |
| 13/567,089 | Aug. 6, 2012 | SYSTEM AND METHOD FOR AUTOMATED ADAPTATION AND IMPROVEMENT OF SPEAKER AUTHENTICATION IN A VOICE BIOETRIC SYSTEM ENVIRONMENT And is also a continuation-in-part of: |
| 12/644,343 Patent 8,625,772 | Dec. 22, 2009 Issue Date Jan. 7, 2014 | INTEGRATED TESTING PLATFORM FOR CONTACT CENTRES |
| Current application | Herewith | AUTOMATED CONTACT CENTER CUSTOMER MOBILE DEVICE CLIENT INFRASTRUCTURE TESTING Is a continuation of: |
| 15/789,667 | Oct. 20, 2017 | AUTOMATED CONTACT CENTER CUSTOMER MOBILE DEVICE CLIENT INFRASTRUCTURE TESTING Which claims priority to, benefit of: |
| 62/491,258 | Apr. 28, 2017 | AUTOMATED CONTACT CENTER AGENT MOBILE DEVICE CLIENT INFRASTRUCTURE TESTING And is also a continuation-in-part of: |
| 15/613,168 Patent 10,367,764 | Jun. 3, 2017 Issue Date Jul. 30, 2019 | SYSTEM AND METHOD FOR AUTOMATED CONTACT CENTER AGENT MOBILE DEVICE CLIENT INFRASTRUCTURE TESTING Which claims priority to, and benefit of: |

-continued

| Application No. | Date Filed | Title |
|---|---|---|
| 62/491,252 | Apr. 28, 2017 | SYSTEM AND METHOD FOR AUTOMATED CONTACT CENTER AGENT MOBILE DEVICE CLIENT INFRASTRUCTURE TESTING |
| | | And is also a continuation-in-part of: |
| 15/491,965 Patent 10,268,571 | Apr. 19, 2017 Issue Date Apr. 23, 2019 | SYSTEM AND METHOD FOR AUTOMATED THIN CLIENT CONTACT CENTER AGENT DESKTOP TESTING |
| | | Which is a continuation-in-part of: |
| 15/083,259 | Mar. 28, 2016 | SYSTEM AND METHOD FOR AUTOMATED END-TO-END WEB INTERACTION TESTING |
| | | Which is a continuation-in-part of: |
| 14/854,023 | Sep. 14, 2015 | SYSTEM AND METHOD FOR AUTOMATED CHAT TESTING |
| | | Which is a continuation of: |
| 14/141,424 Patent 9,137,184 | Dec. 27, 2013 Issue Date Sep. 15, 2015 | SYSTEM AND METHOD FOR AUTOMATED CHAT TESTING |
| | | Is a continuation-in-part of: |
| 14/140,449 Patent 9,137,183 | Dec. 24, 2013 Issue Date Sep. 15, 2015 | SYSTEM AND METHOD FOR AUTOMATED CHAT TESTING |
| | | Which is a continuation of: |
| 13/936,147 | Jul. 6, 2013 | SYSTEM AND METHOD FOR AUTOMATED CHAT TESTING |
| | | Which is a continuation-in-part of: |
| 13/567,089 | Aug. 6, 2012 | SYSTEM AND METHOD FOR AUTOMATED ADAPTATION AND IMPROVEMENT OF SPEAKER AUTHENTICATION IN A VOICE BIOETRIC SYSTEM ENVIRONMENT |
| | | And is also a continuation-in-part of: |
| 12/644,343 Patent 8,625,772 | Dec. 22, 2009 Issue Date Jan. 7, 2014 | INTEGRATED TESTING PLATFORM FOR CONTACT CENTRES |
| Current application | Herewith | AUTOMATED CONTACT CENTER CUSTOMER MOBILE DEVICE CLIENT INFRASTRUCTURE TESTING |
| | | Is a continuation of: |
| 15/789,667 | Oct. 20, 2017 | AUTOMATED CONTACT CENTER CUSTOMER MOBILE DEVICE CLIENT INFRASTRUCTURE TESTING |
| | | which claims priority to, and benefit of: |
| 62/491,258 | Apr. 28, 2017 | AUTOMATED CONTACT CENTER AGENT MOBILE DEVICE CLIENT INFRASTRUCTURE TESTING |
| | | And is also a continuation-in-part of: |
| 15/613,168 Patent 10,367,764 | Jun. 3, 2017 Issue Date Jul. 30, 2019 | SYSTEM AND METHOD FOR AUTOMATED CONTACT CENTER AGENT MOBILE DEVICE CLIENT INFRASTRUCTURE TESTING |
| | | Which claims priorioty to, and benefit of: |
| 62/491,252 | Apr. 28, 2017 | SYSTEM AND METHOD FOR AUTOMATED CONTACT CENTER AGENT MOBILE DEVICE CLIENT INFRASTRUCTURE TESTING |
| | | And is also a continuation-in-part of: |
| 15/491,965 Patent 10,268,571 | Apr. 19, 2017 Issue Date Apr. 23, 2019 | SYSTEM AND METHOD FOR AUTOMATED THIN CLIENT CONTACT CENTER AGENT DESKTOP TESTING |
| | | which is a continuation-in-part of: |
| 15/157,384 Patent 10,230,836 | May 17, 2016 Issue Date Mar. 12, 2019 | SYSTEM AND METHOD FOR AUTOMATED VOICE QUALITY TESTING |
| | | which is a continuation of: |
| 14/709,252 Patent 9,344,556 | May 11, 2015 Issue Date May 17, 2016 | SYSTEM AND METHOD FOR AUTOMATED VOICE QUALITY TESTING |
| | | which is a continuation of: |
| 14/140,470 Patent 9,031,221 | Dec. 25, 2013 Issue Date May 12, 2015 | SYSTEM AND METHOD FOR AUTOMATED VOICE QUALITY TESTING |
| | | which is a continuation of: |

| Application No. | Date Filed | Title |
|---|---|---|
| 13/936,183 | Jul. 6, 2013 | SYSTEM AND METHOD FOR AUTOMATED VOICE QUALITY TESTING which is a continuation-in-part of: |
| 13/567,089 | Aug. 6, 2012 | SYSTEM AND METHOD FOR AUTOMATED ADAPTATION AND IMPROVEMENT OF SPEAKER AUTHENTICATION IN A VOICE BIOETRIC SYSTEM ENVIRONMENT And is also a continuation-in-part of: |
| 12/644,343 Patent 8,625,772 | Dec. 22, 2009 Issue Date Jan. 7, 2014 | INTEGRATED TESTING PLATFORM FOR CONTACT CENTRES | the entire specification of each of which is incorporated herein by reference.

FIELD OF THE INVENTION

The disclosure relates to the field of system testing, and more particularly to the field of automated quality assurance testing of contact center customer mobile device function when used as part of a contact center's overall solution of both hardware and software components which may include mobile devices from multiple vendors running multiple operating systems.

DISCUSSION OF THE STATE OF THE ART

FIG. 1 (PRIOR ART) is a typical system architecture diagram of a contact center 100 known to the art. A contact center is similar to a call center, but a contact center has more features. While a call center may communicate mainly by voice, a contact center may communicate via email; text chat, such as, but not limited to, instant messaging, social media posts, and SMS interaction; and web interfaces in addition to voice communication in order to facilitate communications between a customer endpoint 110 and a resource endpoint 120. Resource 120 may include, but is not limited to, agents, sales representatives, service representatives, or collection agents handling communications with customers 110 on behalf of an enterprise. Resources 120 may be in-house within contact center 100, or may be remote, such as out-sourcing to a third party, or agents working from home. Contact center 100 may be independently operated or networked with additional centers, and may often be linked to a corporate computer network.

Contact center 100 may further comprise network interface 130, text channels 140, multimedia channels 145, and contact center components 150. Text channels 140 may be communications conducted mainly through text, and may comprise social media 141, email 142, short message service (SMS) 143, or instant messaging (IM) 144, and would communicate through their counterparts within contact center components 150, each respectively being social server 159, email server 157, SMS server 160, and IM server 158.

Multimedia channels 145 may be communications conducted through a variety of mediums, and may comprise a media server 146, private branch exchange (PBX) 147, interactive voice response (TVR) 148, and bots 149. Text channels 140 and multimedia channels 145 may act as third parties to engage with outside social media services and so a social server 159 may be required to interact with the third party social media 141. Multimedia channels 145, are typically present in an enterprise's datacenter; but could be hosted in a remote facility, in a cloud facility, or in a multifunction service facility.

Contact center components 150 may comprise a routing server 151, a session initiation protocol (SIP) server 152, an outbound server 153, a computer telephony integration (CTI) server 154, a state and statistics (STAT) server 155, an automated call distribution facility (ACD) 156, an email server 157, an IM server 158, a social server 159, a SMS server 160, a routing database 170, a historical database 172, and a campaign database 171. It is possible that other servers and databases may exist within a contact center, but in this example the referenced components are used. Contact center components 150, including servers, databases, and other key modules that may be present in a typical contact center may work in a black box environment, may be used collectively in one location, or may be spread over a plurality of locations. Contact center components 150 may even be cloud-based, and more than one of each component shown may be present in a single location.

Customers 110 may communicate by use of any known form of communication known in the art, be it by a telephone 111, a mobile smartphone 112, a tablet 113, a laptop 114, or a desktop computer 115, to name a few examples. Similarly, resources 120 may communicate by use of any known form of communication known in the art, be it by a telephone 121, a mobile smartphone 122, a tablet 123, a laptop 124, or a desktop computer 125, to name a few examples. Communication may be conducted through a network interface 130 by way of at least one channel, such as a text channel 140 or a multimedia channel 145, which communicates with a plurality of contact center components 150. Available network interfaces 130 may include, but is not limited to, a public switched telephone networks (PSTN) 131, an internet network 132, a wide area network (WAN) 133, or a local area network (LAN) 134.

To provide a few example cases, a customer calling on telephone handset 111 may connect through PSTN 131 and terminate on PBX 147; a video call originating from tablet 123 may connect through internet connection 132 and terminate on media server 146; or a customer device such as smartphone 112 may connect via WAN 133, and terminate on IVR 148, such as in the case of a customer calling a customer support line for a bank or a utility service. In another example, an email server 157 would be owned by the contact center 100 and would be used to communicate with a third-party email channel 142. The number of communication possibilities are vast between the number of possible devices of resources 120, devices of customers 110, networks 130, text channels 140, multimedia channels 145, and contact center components 150, hence the system diagram on FIG. 1 indicates connections between delineated groups rather than individual connections for clarity.

Continuing from the examples given above, in some conditions where a single medium (such as ordinary telephone calls) is used for interactions that require routing, media server 146 may be more specifically PBX 147, ACD 156, or similar media-specific switching system. Generally, when interactions arrive at media server 146, a route request, or a variation of a route request (for example, a SIP invite message), is sent to SIP server 152 or to an equivalent system such as CTI server 154. A route request may be a data message sent from a media-handling device, such as media server 146, to a signaling system, such as SIP server 152. The message may comprise a request for one or more target destinations to which to send (or route, or deliver) the specific interaction with regard to which the route request was sent. SIP server 152 or its equivalent may, in some cases, carry out any required routing logic itself, or it may forward the route request message to routing server 151. Routing server 151 executes, using statistical data from STAT server 155 and, optionally, data from routing database 170, a routing script in response to the route request message and sends a response to media server 146 directing it to route the interaction to a specific target in resources 120.

In another case, routing server 151 uses historical information from historical database 172, or real-time information from campaign database 171, or both, as well as configuration information (generally available from a distributed configuration system, not shown for convenience) and information from routing database 170. STAT server 154 receives event notifications from media server 146, SIP server 152, or both regarding events pertaining to a plurality of specific interactions handled by media server 146, SIP server 152, or both, and STAT server 155 computes one or more statistics for use in routing based on the received event notifications. Routing database 170 may comprise multiple distinct databases, either stored in one database management system or in separate database management systems. Examples of data that may normally be found in routing database 170 may include, but are not limited to: customer relationship management (CRM) data; data pertaining to one or more social networks, including, but not limited to network graphs capturing social relationships within relevant social networks, or media updates made by members of relevant social networks; skills data pertaining to a members of resources 120, which may be human agents, automated software agents, interactive voice response scripts, and so forth; data extracted from third party data sources including cloud-based data sources such as CRM and other data from SALESFORCE.COM™, credit data from EXPERIAN™, consumer data from DATA.COM™; or any other data that may be useful in making routing decisions. It will be appreciated by one having ordinary skill in the art that there are many means of data integration known in the art, any of which may be used to obtain data from premise-based, single machine-based, cloud-based, public or private data sources as needed, without departing from the scope of the invention. Using information obtained from one or more of STAT server 155, routing database 170, campaign database 172, historical database 171, and any associated configuration systems, routing server 151 selects a routing target from among a plurality of available resource devices 120, and routing server 151 then instructs SIP server 152 to route the interaction in question to the selected resource 120, and SIP server 152 in turn directs media server 146 to establish an appropriate connection between customer 110 and target resource 120. In this case, the routing script comprises at least the steps of generating a list of all possible routing targets for the interaction regardless of the real-time state of the routing targets using at least an interaction identifier and a plurality of data elements pertaining to the interaction, removing a subset of routing targets from the generated list based on the subset of routing targets being logged out to obtain a modified list, computing a plurality of fitness parameters for each routing target in the modified list, sorting the modified list based on one or more of the fitness parameters using a sorting rule to obtain a sorted target list, and using a target selection rule to consider a plurality of routing targets starting at the beginning of the sorted target list until a routing target is selected. It should be noted that customers 110 are generally, but not necessarily, associated with human customers or users. Nevertheless, it should be understood that routing of other work or interaction types is possible, although in any case, is limited to act or change without input from a management team.

As contact center software solutions from a number of vendors which together perform all needed tasks, whether as a single monolithic service or a set of multiple service offerings, have become more complex, so have the systems and techniques needed to monitor and test them. The ability to qualify new software versions and variants on the entire range of hardware types expected to be deployed, to qualify new hardware or software combinations as they arise, or to monitor functional efficiency under conditions mimicking actual live usage has become much more important. These types of test software currently exists, and may run on either dedicated equipment, or on live equipment under instances of low live traffic. However, the current solutions may be inflexible in deployment; requiring significant preplanning and hardware resources; lack the ability to test function of important emerging system configurations, such as those that include mobile devices as endpoints of interaction; have little modification capability while running; lack the ability to run unobtrusively and thus cannot be used to diagnose problems encountered during actual call center use; have inflexible result reporting abilities; and require a significant amount of programming knowledge to administer.

What is needed are computer service package testing suites that are easy and flexible to deploy, that accept modifications without the use of complex procedures while running, that have highly configurable and easily specified reporting formats, that can be deployed through a centralized gateway using simplified runtime commands instead of programming changes to the suites' source code themselves and that can be used to test a wide range of both software and hardware combinations in use, including mobile devices.

SUMMARY OF THE INVENTION

Accordingly, the inventor has conceived and reduced to practice, a system and method for automated contact center customer mobile device client infrastructure testing which has a single interface, does not need significant programming ability to operate, automates many types of testing and allocates resources and pre-loads test payloads.

According to a preferred embodiment of the invention, a system and method for conducting centrally controlled, robust and easily customized contact center customer mobile device client tests has been created. This centralized test suite may execute tests for voice and chat interaction software, and other general functions (such as performing transactional operations that are utilized to set the context of a customer's subsequent interactions both via mobile and not) in conjunction with any support software frequently used by the contact center. Customer mobile devices with differing CPU, RAM, operating system vendor, versions and patch levels, voice or chat management software versions or vendors as well as third party software payloads may be easily tested concurrently with results categorized and information depth dictated by the test analysts. Test setup is accomplished using a robust set of simple test directive commands and modifiers which insulates the analyst from the underlying programming. Commands and modifiers may be strung together to form macros that represent more complex test case conditions. The embodiment allows for testing to be run on live customer mobile devices without noticeable disruption of actual customer time and also allows testing to be run on specially set aside, otherwise idle customer mobile devices depending on the needs of the test conditions. The suite is such that stopping or modifying a test under execution may be accomplished without catastrophic test disruption, or programming knowledge of test execution.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 1 (PRIOR ART) is a typical system architecture diagram of a contact center including components commonly known in the art.

FIG. 2 is a block diagram illustrating an exemplary system architecture for an automated contact center test engine including a mobile device test module, according to a preferred embodiment of the invention FIG. 3 is a block diagram illustrating an exemplary system architecture for a system and method for automated chat and automated voice testing services on customer mobile devices, according to a preferred embodiment of the invention.

FIG. 4 is a block diagram illustrating an exemplary system architecture 400 for a system and method for automated general functions testing according to a preferred embodiment of the invention.

FIG. 5 is a method flow diagram illustrating an exemplary system for certifying mobile devices of different operating systems, hardware configurations and possibly differing software payloads prior to a full scale update of call center voice software, call center chat software, call center customer relationship management system software or when issues in performance are detected with existing software on workstations of different configuration according to a preferred embodiment of the invention.

DETAILED DESCRIPTION

Figure 1:
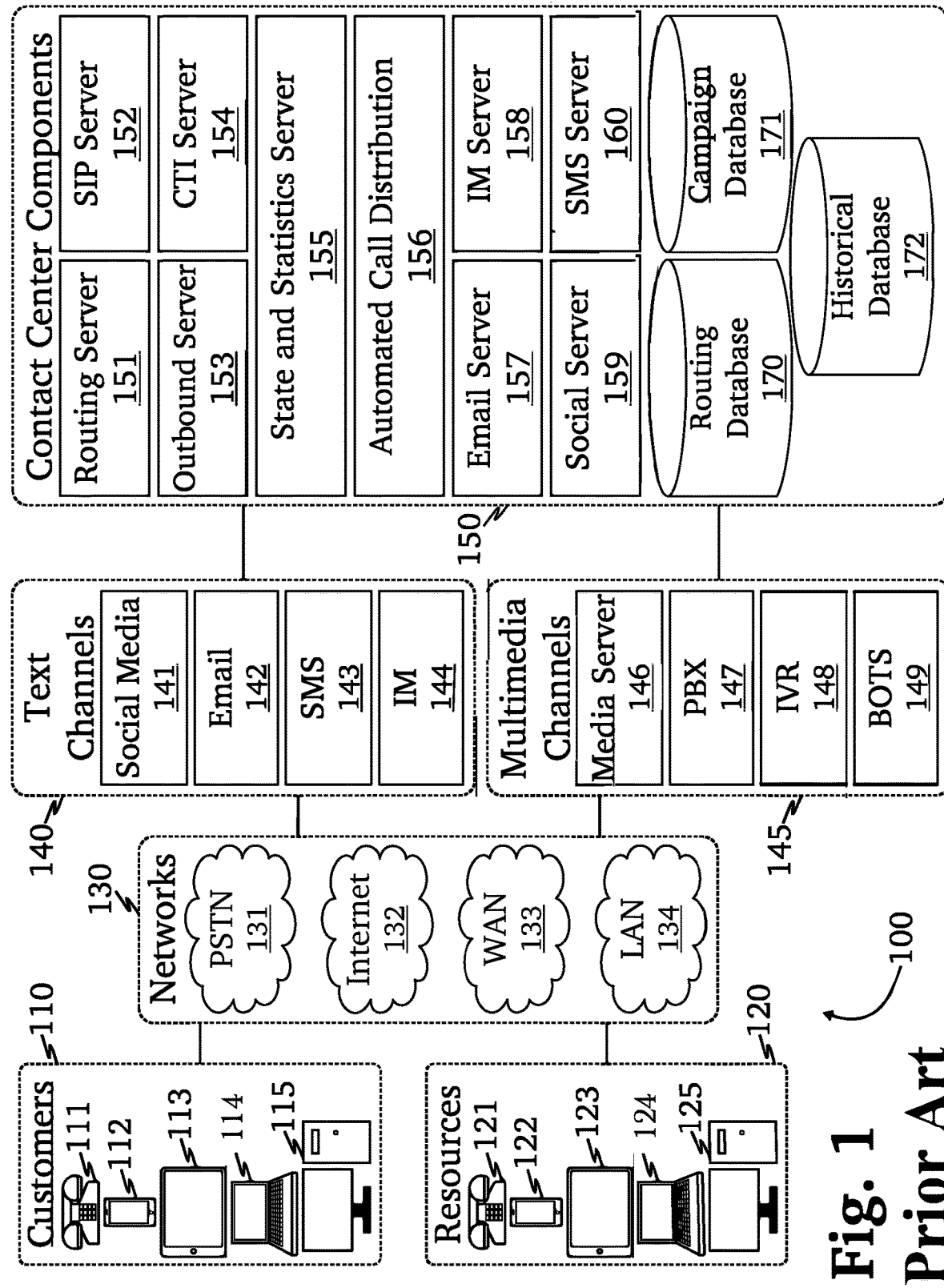

The inventor has conceived, and reduced to practice, in a preferred embodiment of the invention, a system and method for automated contact center customer client infrastructure testing.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 2:
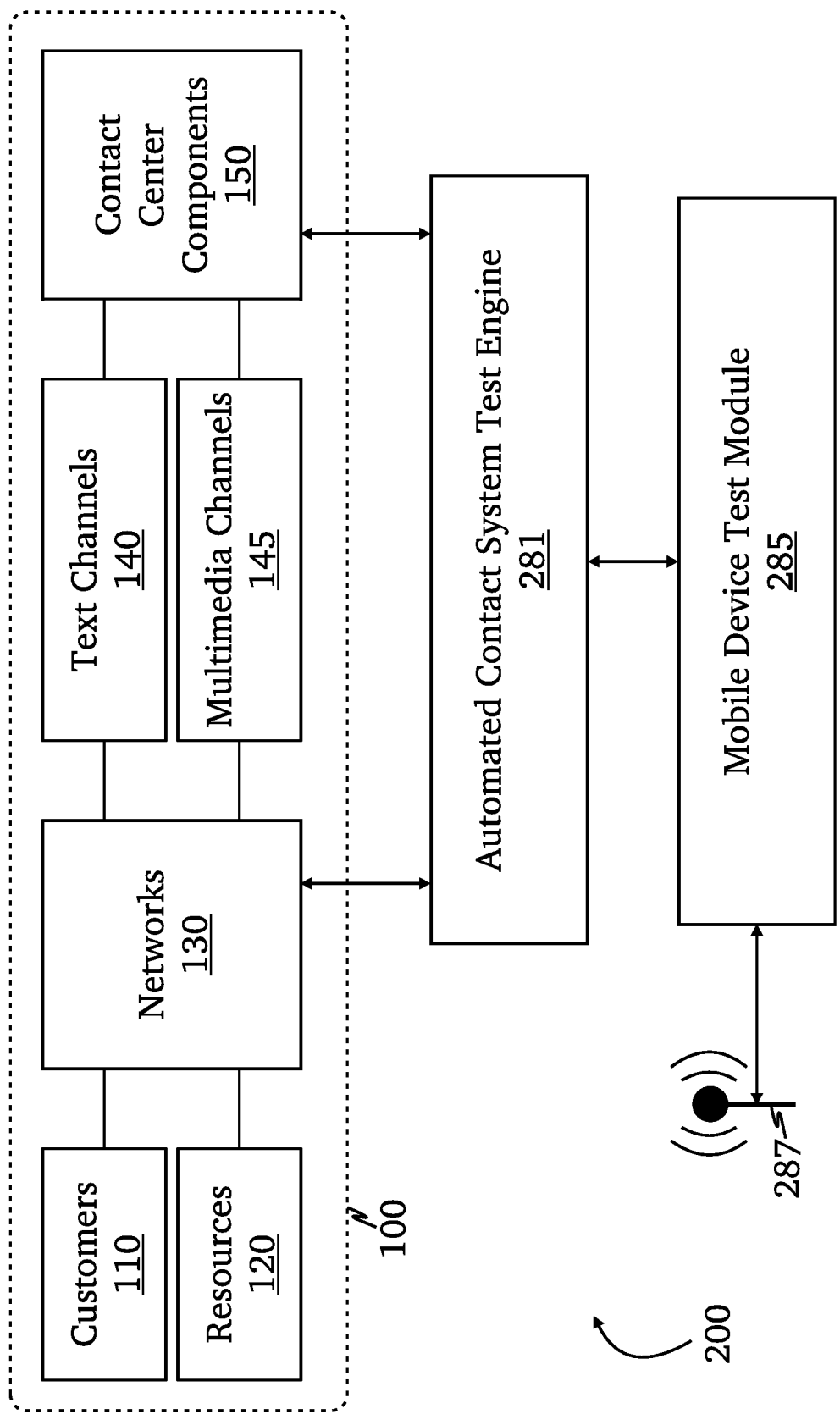

FIG. 2 is a block diagram illustrating an exemplary system architecture 200 for an automated contact center test engine including a mobile device test module, according to a preferred embodiment of the invention. According to the embodiment, system 200 may comprise a standard contact center 100 with the addition of new elements: an automated end-to-end contact center testing system 281, and a mobile device testing module 285, both of which may be operating on at least one network 130, 287 as illustrated.

As discussed above in FIG. 1, a plurality of customers 110 and network-connected resources 120 may connect to a contact center 150 via a network 130 using a variety of specific communication means which may include, but not limited to, text-based communication channels 140, such as social media networks 141, email 142, SMS 143, instant messaging 144; or via multimedia communication channels 145, such as through media server 146, PBX 147, IVR system 148, or via communication bots 149 that may automate or simulate communication (as may be used for testing purposes without relying on actual customer communication). Communication may occur over a variety of network interfaces 130, such as, but not limited to, PSTN 131, the Internet 132, WAN 133, or LAN 134 according to various arrangements. For example, internal testing may occur exclusively within a LAN, whereas testing of online helpdesk interactions may use Internet-connected IM, email, or other arrangements to provide practical metrics pertaining to bandwidth, server load, and the like.

A contact center may comprise a number of systems and features common in the art, such as, for example, a routing server 151 that directs other components based on routing instructions from a routing database 170 to route interactions to appropriate handling endpoints (such as agents to answer calls or IMs), a SIP server 152 that handles SIP-based telephony, an outbound server 153 that processes outbound interaction attempts such as customer callbacks, STAT server 155 that manages internal contact center state monitoring and statistics (for example, tracking interaction metrics such as handle time, queue wait time, number of interactions handled or transferred, and other various metrics that are commonly tracked in contact center operations), or an automated call distributor (ACD) that may be used to automatically distribute interactions to endpoints (for example, based on customer input or agent skills). Additionally, a variety of interaction servers may be used to appropriately receive, process, and handle interactions such as a CTI server 154 that may be used to connect telephony and computer-based or IP technologies, email server 157 that may be used to handle email-based interactions, IM server 158 that may be used to handle web-based instant messaging, social server 159 that may be used to handle content from social media networks (such as communicating directly with a social network's public API, for example to read and process content and user messages), or SMS server 160 that may be used to handle SMS-based text messages. Additionally, contact center campaign information (for example, metric goals pertaining to a particular customer or campaign) may be stored in campaign database 171 for reference, and historical interaction information may be stored in historical database 172, such as to store call recording for later reference or analysis.

Figure 3:
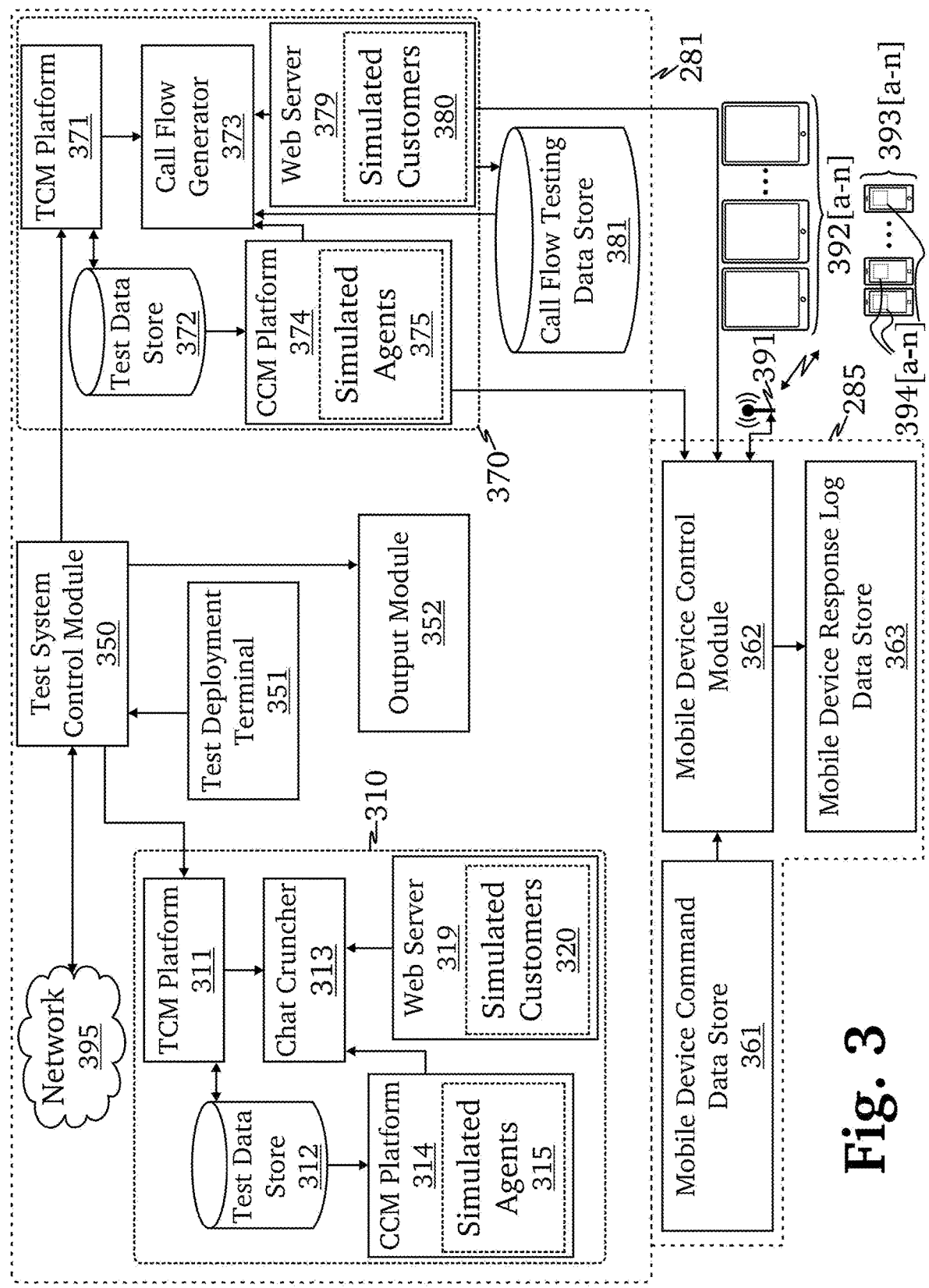

FIG. 3 is a block diagram illustrating an exemplary system architecture 300 for a system and method for automated chat and automated voice testing services on customer mobile devices, according to a preferred embodiment of the invention. End-to-end contact center testing systems 281 are invariably quite complex and may greatly benefit from a deployment system that allows scheduling, initiation, specification, management, and allocation of resources for a wide range of analyses without the need for extensive programming knowledge on the part of the analyst.

A system for automated chat testing 310 may incorporate common contact center elements, including customer mobile devices such as smartphones 393a to 393n, and tablets 392a to 392n, each running one or more command center package clients and support software employed by the customer contact center. Testing of these mobile devices may require that a set of varied mobile devices with regard to type, underlying operating system and individual software payload be seamlessly tested, and the results, which may be different in format due to operating system differences, normalized for meaningful presentation with data from other sources. These control and normalization capabilities may require the presence of a dedicated mobile device testing module 285. For contact center testing engine 281 to be most predictive to performance under operation, it may run in parallel to actual contact center operations. As illustrated, chat testing system 310 may implement a test case management (TCM) platform 311, which may serve as the beginning or origin of a test case. TCM platform 311 may operate autonomously using preprogrammed standard tests tailored to a specific customer, or optionally may accept human interaction from a test system control portal 350. In some cases, a local test control terminal 351 may be used. Local test control terminal 351 may provide a graphical user interface for manipulation of test cases using runtime commands and parameters rather than through modification of test function code, and may also provide a means for accessing an output module 352 to allow viewing of both interim and final test result reports on a text-based output terminal. These results and test related code may also be permanently stored in a testing database 312. Other embodiments may employ a networked test deployment terminal and output module (not shown) which may connect from a distance using a network connection 395, such as a virtual private network or similar secure long-distance connection familiar to those skilled in the art. When a test is run, TCM platform 311 initiates a test case with chat cruncher 313 and contact center manager (CCM) platform 314, which may each then begin their respective automated testing processes. In embodiments that are configured to exercise contact center customer mobile devices 392a to 392n, 393a to 393n, chat cruncher 313 may simulate a plurality of virtual customers 320, which may operate via a web server 319, to send and receive data from the mobile devices through one or more mobile device control modules 362 and associated mobile device response log data store 363. CCM platform 314 may similarly simulate virtual contact center agents 315 which may receive and respond to data requests on each of a plurality of mobile devices which may have differing physical specifications and third-party software loads. Data requests sent by simulated customers 320 through the mobile device control module 362 and then to a mobile device automation module 394a-n operating on a mobile device 392a-n, 393a-n. Commands may come through a wireless network (which may include a WiFi connection or network of device's cellular provider 391), or a direct physical data connection (such as a universal serial bus or USB memory device). Any mobile device specific commands may originate from a mobile device command data store 361. Mobile device commands may be commands that may be required to prepare and support each mobile device undergoing testing, including, but not limited to, the ability of the CCM simulated agents to issue and retrieve responses, and case management text to each mobile device as required by test module parameters provided by mobile device control module 362. A mobile device automation module 394a-n may then execute commands on the processor of the mobile device, interacting as needed with other device hardware or software to perform the command tasks, for example to initiate a voice call (which may be a telephony call or a VoIP call using a packet data network) using click-to-dial, and optionally pre-authenticating the customer by retrieving and providing any needed credentials (such as an access code or account number to be provided to an IVR system that is being dialed). Responses, both those from simulated agents and from possible data flow metrics and mobile device status information, may follow the reverse transmission pathway from the mobile device through the wireless network to the mobile device control module 362, where that information may then be forwarded to a test data store 312 or mobile device response log data store 363, depending on the nature of the data and test specific parameters. Using the described test architecture, it will be appreciated that the flow of data requests within a test case is bidirectional. For example, requests may continually and asynchronously be sent from simulated customers 320 to simulated agents 315 and vice-versa, without necessitating a strict pattern or rhythm of data flow. It will also be appreciated that in such a manner, it is possible to simulate a customer sending multiple chat requests (or other text- or voice-based requests) while an agent waits to send a response, or for an agent to send multiple requests while a customer waits. Such occurrences are commonplace in practice, and in this manner a test case may more accurately simulate actual contact center operations for more relevant and reliable testing data.

Contact center voice interaction with customers may place significantly more load on the customer's mobile devices 392a-n, 393a-na; on the wireless network(s) on which the mobile device operates, as voice may require a wider bandwidth to present; and there may be speech-to-text transcription functions to perform at some point within the contact center system. There may also be some pressure to provide a faster response during voice interaction which may lead to increased concurrent use of a wide range of software resources in a voice interaction environment. A system for automated voice call testing 370 may incorporate common contact center elements and running in parallel to actual contact center operations. As illustrated, and similar to chat testing system 310, call testing system 370 may also have its own TCM platform 371 that may serve as the beginning or origin of a test case. TCM platform 371 may also operate autonomously, or, optionally, may accept human interaction at a test system control portal 350 via test terminal 351 for manipulation of test cases, and viewing of both interim and final test result reports with output module 352. Test results may be stored in a testing database 372. When a test is run, TCM platform 371 initiates a test case with call generator 373 and CCM platform 374, which may each begin their respective automated testing processes. Call flow generator 373 may simulate a plurality of virtual customers 380, which operate via a web server 379, and may send voice data requests pre-stored in a call flow testing data store 381. In this embodiment, all outbound and inbound voice data is transmitted through a mobile device control module 362 to the wireless network interface 391, which may be the contact center's wireless network, such as WiFi, or the mobile device's service provider's network. CCM platform 374 may similarly simulate virtual contact center agents 375, which may receive and respond to voice data requests by exercising various features of the contact center's customer relationship management software (CRM) mobile device client app in response to the test parameters possibly as supported by a mobile device command data store 361 operating as part of the function of mobile device control module 362. Data requests sent by simulated customers 380 arriving at the mobile device control module 362 may be forwarded to a receiving mobile device under test 392b and requests from agents 392b to customers also via a mobile device control module 362. Virtual agents 375 may operate by interacting with the mobile device control module 362 according to the specific nature of a test case. During and/or after the execution of a test case, data may be stored in data store 372 by CCM platform 374 or call generator 373, for the formulation of test reports to be stored for later viewing by a user via TCM platform 371. In this manner, it will be appreciated that the flow of data requests within a test case is bidirectional, i.e. requests may continually and asynchronously be sent from simulated customers 380 to simulated agents 375 and vice-versa, without necessitating a strict pattern or rhythm of data flow. It will be appreciated that in such a manner it is possible to simulate a customer uttering multiple voice requests, requiring further CRM interaction while an agent attempts to fulfill a prior task, or for an agent to have to wait while a customer produces needed data. Such occurrences are commonplace in practice, and in this manner a test case may more accurately simulate actual contact center operations for more relevant and reliable testing data.

Figure 4:
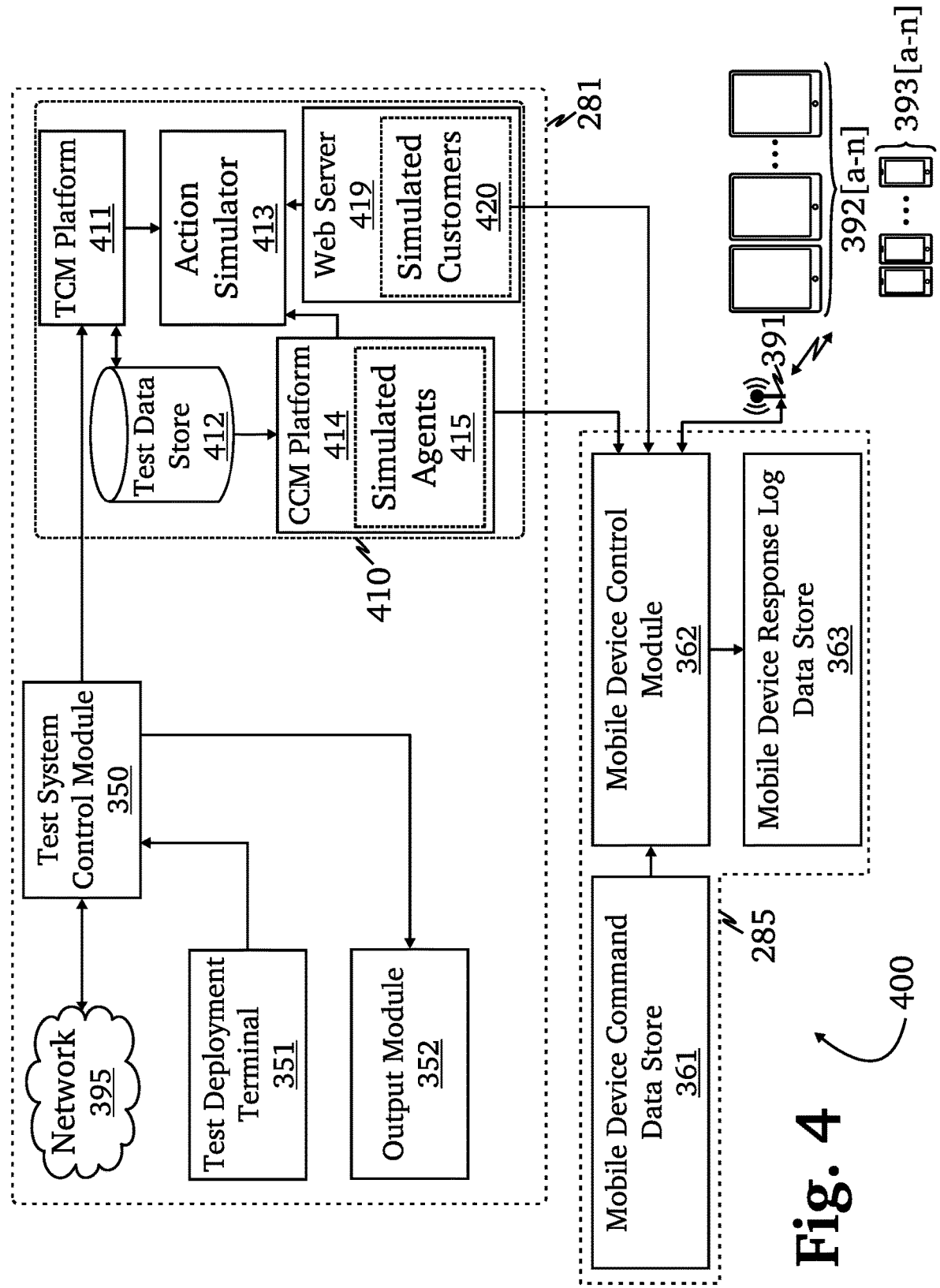

Besides testing chat and voice services, a business may want to conduct generalized testing of their mobile website or mobile apps, to monitor and test various non-interaction usage that may provide additional information pertaining to a customer "journey" as they interact with various software and systems. For example, if a customer performs a balance transfer via a banking app and then uses a click-to-dial button to call for assistance, the balance transfer may provide additional insight into the reason for the call, and this information may be used to expedite IVR interaction or to bring a contact center agent up to speed on the customer's situation. This scenario may be simulated during testing to (for example) ensure that the proper information is being collected and sent to the correct endpoints (IVR, real or virtual agents, etc.) so that the customer journey is handled efficiently. To provide this function, automated contact system test engine may be configured to conduct more generalized testing. FIG. 4 is a block diagram illustrating an exemplary system architecture 400 for a system and method for automated general functions testing according to a preferred embodiment of the invention. General testing system 400 may be identical to chat and voice testing system 300 with components and functions, such as, a network connection 395, a testing system control module 350, a test deployment terminal 351, an output module 352, a mobile device command data store 361, a mobile device control module 362, a mobile device response log data store 363, a wireless network 391, and mobile devices 392 [a-n] and 393 [a-n]. Functions discussed above such as the ability to modify tests during runtime, and creation or modification of tests without extensive programming knowledge, to name a few, are also available. The difference is the automated testing system; whereas testing system 300 features an automated voice testing system 370, and automated chat testing system 310, for testing voice systems and chat systems, respectively, general testing system 410 may test general functions of a mobile website or a mobile app. Automated general testing system 410, itself, may have many features that may be found in automated voice testing system 370, and automated chat testing system 310, such as, a TCM platform 411 for starting and running tests, test data store 412 for storing of test results and test code, a CCM platform 414 for running of simulated agents 415, and a web server 419 for running of simulated customers 420. The unique feature of general testing system 410 is an action simulator 413. Action simulator 413 may be configured by a tester to designate emulate actions that a user or agent may issue when browsing a mobile website, or using a mobile app using a wide variety of mobile device configurations. These actions may include, but is not limited to, logging-in to a system, accessing or exiting a mobile site or mobile app, navigating a website or app, accessing data stored on system databases, using unique functions provided by the website or app, activating and conducting simulated customer-agent interactions, and the like. Testing may be conducted in conjunction and in parallel with live systems without disruption of running services, or conducted in isolation on a test system. Additionally, general testing system 410 may spawn a large number of simulated agents, and simulated customers to test the mobile website or mobile app under stressed conditions. This may provide the business with valuable insight into any problematic parts and failure points before deploying new software or new versions to the public.

Centralized deployment of all test set-up, initiation and status review is afforded by logically connecting the test system portal 350 and user interface 351 to the TCM Platforms 311, 371, 471 of the test system. Remote review of test status, as well as review of test results, is also afforded by network connection 395 of test system portal 350.

It should be understood that although automated chat test system 310, automated voice test system 370, and automated general test system 410 are illustrated in separate systems, this is not meant to indicate any type of limitation of the invention. These features, amongst others, may be featured on a single system, or a plurality of systems depending on the requirements of the user.

Detailed Description of Exemplary Aspects

Figure 5:
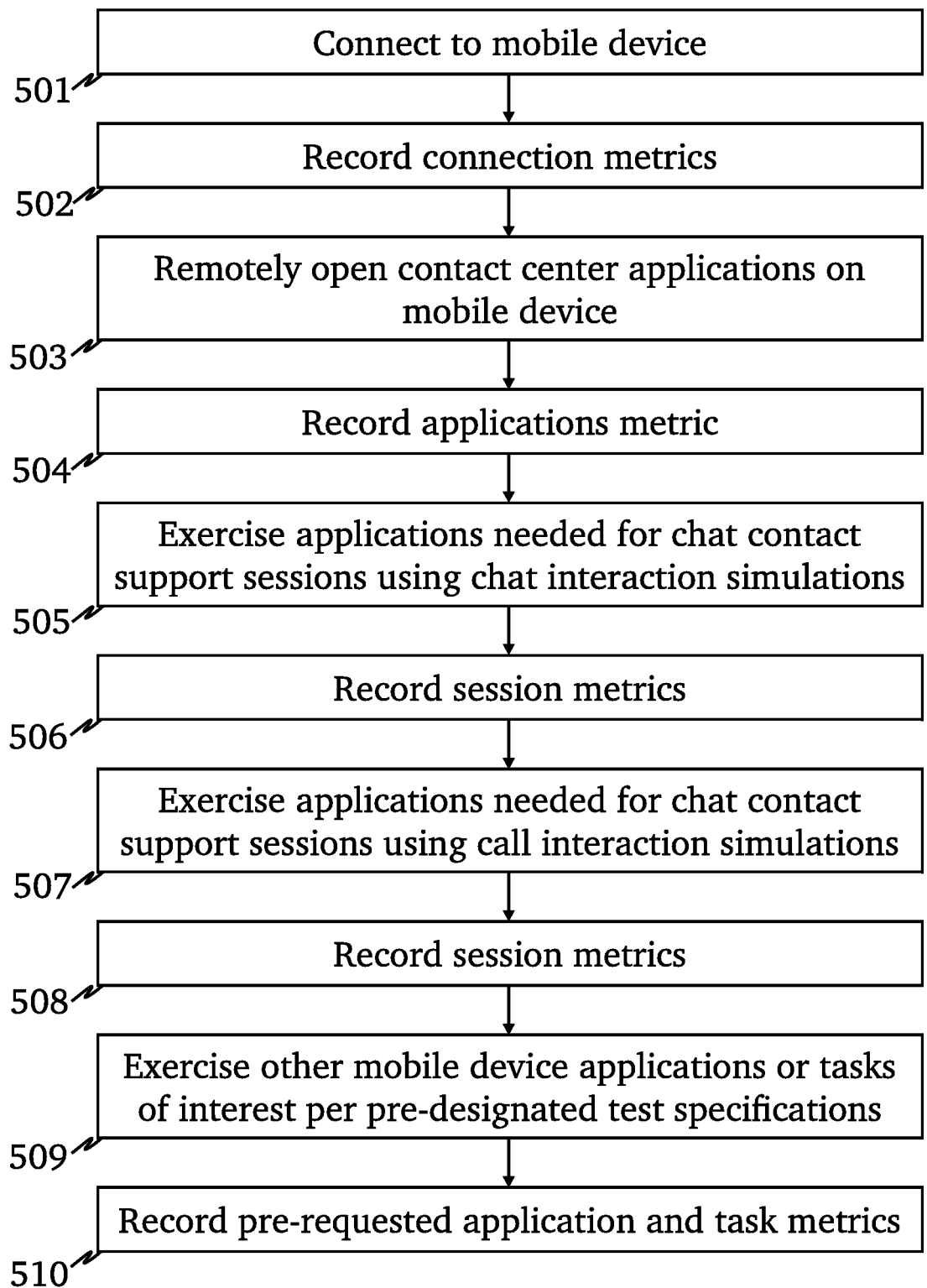

FIG. 5 is a flow diagram illustrating an exemplary method 500 for certifying mobile devices of different operating systems, hardware configurations, and software payloads prior to a full-scale update of call center voice software, call center chat software, call center customer relationship management system software; or when issues in performance are detected with existing software on workstations of different configuration according to a preferred embodiment. Testing of each mobile device and mobile device clients begins when the embodiment connects to the mobile device at step 501. This may be through a contact center's wireless network such, as a WiFi network or over mobile device's service provider's network. At step 502, once a stable bidirectional logical connection has been established, connection metrics are recorded. Connection metrics may include, but would not be limited only to, connection set-up time, connection signal strength, mobile device location (as determined by GPS or LAN/WAN station triangulation), and applications running on the mobile device among other items known to those skilled in the art. At step 503, contact center clients and support apps may then be opened if not already running. While this function is only listed once in the flow diagram for simplicity, applications may be remotely opened as needed to fulfill the specifications of a running mobile device operation test at any point during testing. At step 504, the metrics of starting the standard contact center apps on each mobile device, which may include but are not limited to time from app initiation to ready for input, CPU usage during launch and at ready for input, and active memory usage among other factors known to those skilled in the art will be monitored and recorded. At step 505, the software modules for generating and implementing varying simulated chat communication tests, chat testing module 310 described in FIG. 3, along with other possible processes specified by test parameters, may then be used to fully exercise contact center chat support applications. At step 506, chat operational metrics for the tested mobile device will then be recorded for later review. At step 507, a similar exercise of voice call support apps on mobile device may then be undertaken in manners analogous to simulated chat testing in step 505 with call testing module 370. At step 508, metrics of interest from the simulated call testing may be recorded for later review. At step 509, other mobile device resident applications that may affect contact center app operation either by a direct yet unforeseen interaction with those contact center apps or through factors such as but not limited to CPU usage, and running memory usage may be undertaken per specific preprogrammed test parameters with general test module 410. At step 510, the pre-designated results of such preprogrammed supplemental testing may also be recorded for later review.

It should be noted that although method 500 illustrates a comprehensive test of chat, call, and general functions, the various tests may be conducted in any order, and particular tests may be picked and executed according to user requirements. For example, if a business only requires testing of the chat functions of a mobile website or mobile app, only the chat function may be conducted, and voice and general functions testing may be omitted.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 6:
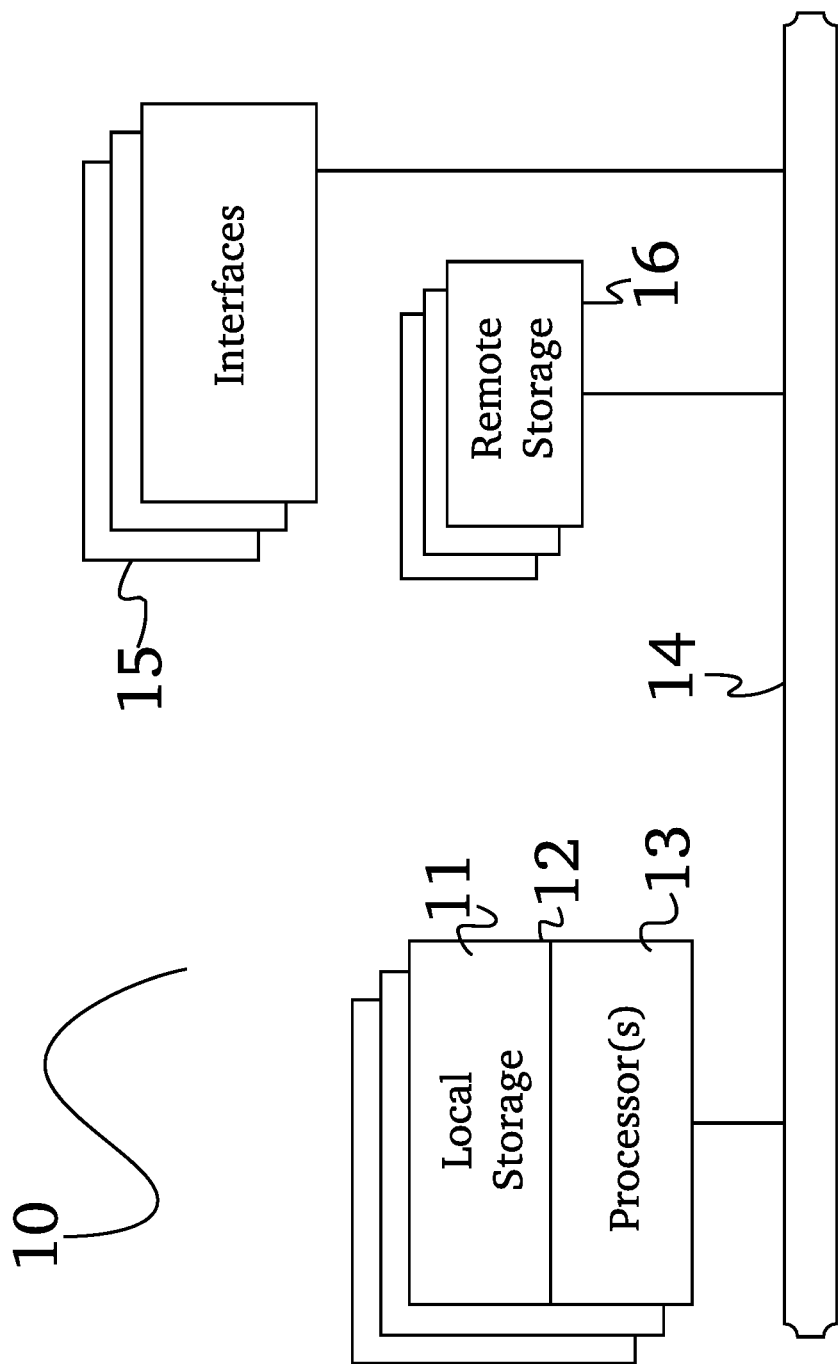
FIG. 6 is a block diagram illustrating an exemplary hardware architecture of a computing device used in an embodiment of the invention.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™ THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
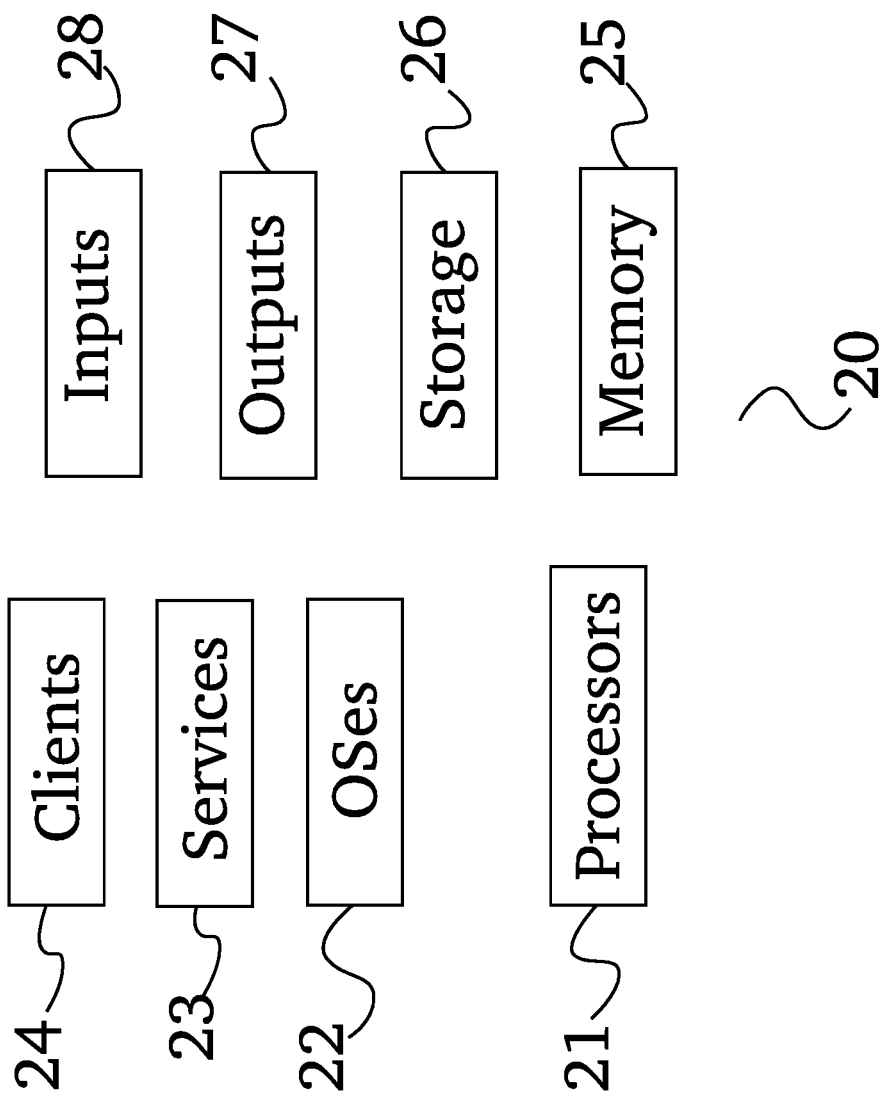
FIG. 7 is a block diagram illustrating an exemplary logical architecture for a client device, according to an embodiment of the invention.

In some aspects, systems may be implemented on a standalone computing system. Referring now to FIG. 7, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
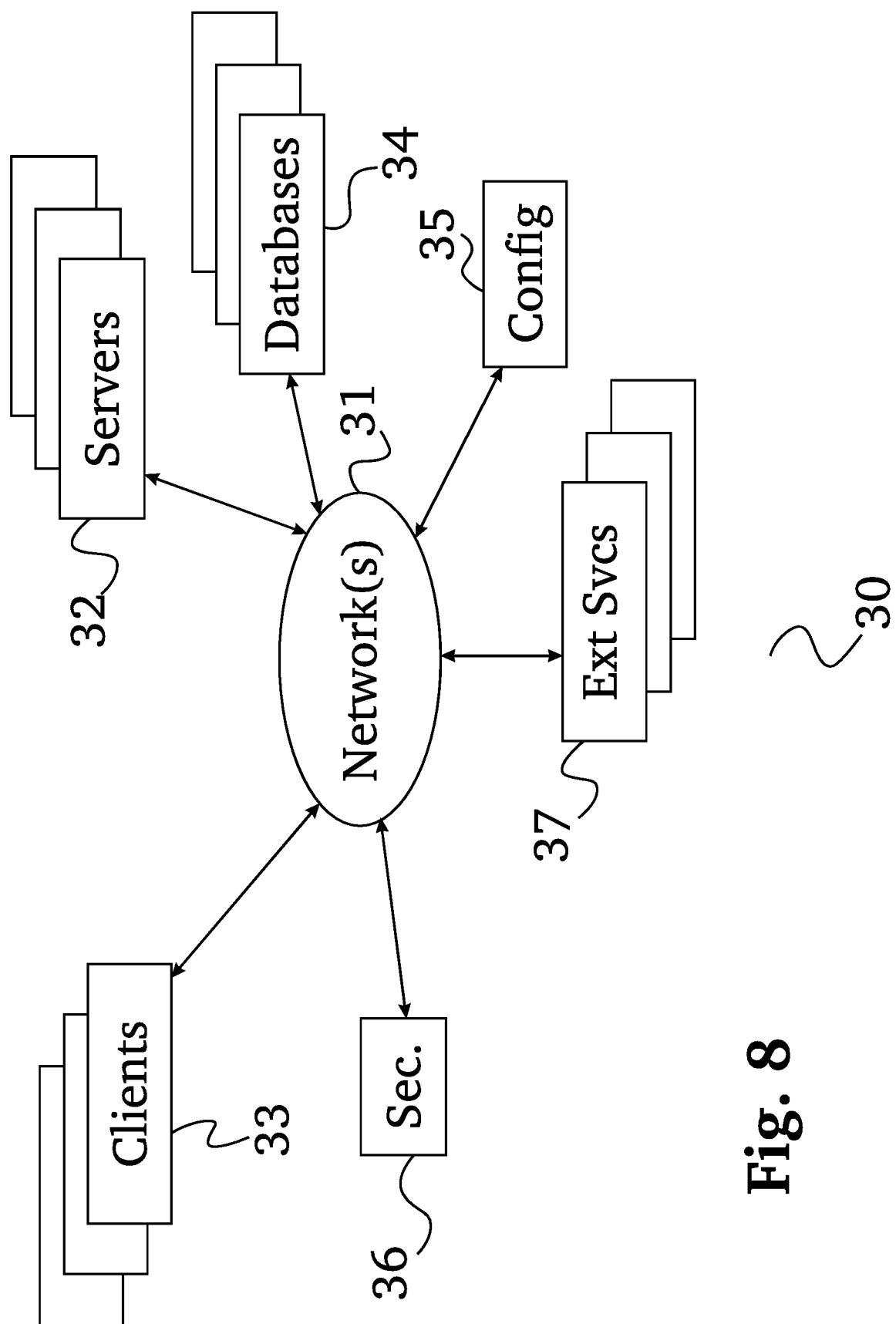
FIG. 8 is a block diagram showing an exemplary architectural arrangement of clients, servers, and external services, according to an embodiment of the invention.

In some aspects, systems may be implemented on a distributed computing network, such as one having any number of clients and/or servers. Referring now to FIG. 8, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 9:
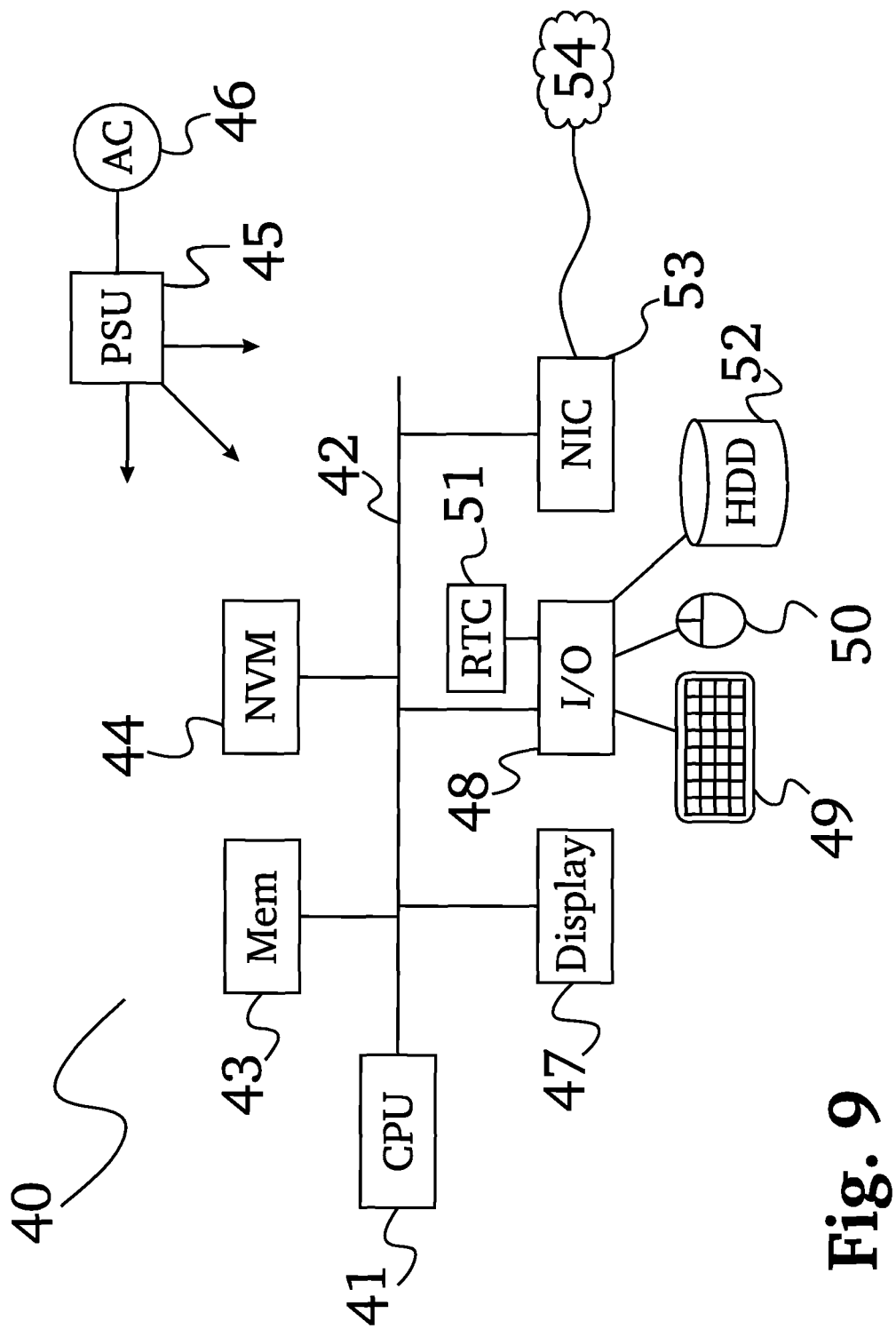
FIG. 9 is another block diagram illustrating an exemplary hardware architecture of a computing device used in various embodiments of the invention.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed:

1. A system for automated mobile device performance certification for contact centers comprising:
   a mobile device command repository configured to store a plurality of mobile device certification initiation commands, each certification initiation command being configured to cause a wireless mobile device to initiate a test of its performance related to a connection with a contact center system; and
   a mobile device control module comprising at least a plurality of programming instructions stored in a memory and operating on a processor of a network-connected computing device, wherein the mobile device control module is configured to:
      retrieve a mobile device certification initiation command from the mobile device command repository;
      connect to a wireless mobile device;
      send the mobile device certification initiation command to the mobile device;
      receive a performance result from the wireless mobile device;
      compare the performance result with a performance standard; and
      certify the mobile device for a contact center if the performance result complies with the performance standard; and
   a wireless mobile device comprising a wireless network adapter, a memory, a processor, and a plurality of programming instructions stored in the memory, wherein the plurality of programming instructions, when operating on the processor, cause the wireless mobile device to:
      receive a connection from the mobile device control module;
      receive a certification initiation command from the mobile device control module;
      execute a certification program corresponding to the certification initiation command by:
         establishing a connection with the contact center via a means of communication set forth in the certification program;
         recording one or more connection metrics associated with the connection;
         opening and running a contact center support application on the wireless mobile device;
         recording one or more application metrics associated with the opening and running of the contact center support application;

sending the connection metrics and application metrics to the mobile device control module as a performance result.

2. The system of claim 1, further comprising a mobile device response log data store, wherein the mobile device response log data store stores performance result data.

3. The system of claim 1, wherein the connection is one of a cellular voice connection, a cellular data connection, a wired Internet connection, and a wireless Internet connection.

4. The system of claim 1, wherein at least one of the connection metrics is selected from connection setup time, connection signal strength, and mobile device location.

5. The system of claim 1, wherein at least one of the application metrics is selected from time from application initiation to ready for input, CPU usage during launch, CPU usage at ready for input, and active memory usage.

6. The system of claim 1, wherein the means of communication set forth in the certification program comprises a voice call using a telephony network.

7. The system of claim 1, wherein the means of communication set forth in the certification program is a VoIP call using a packet data network.

8. The system of claim 1, wherein the means of communication set forth in the certification program is a video call.

9. The system of claim 1, further comprising a mobile device response log data store, wherein the mobile device response log data store stores performance result data.

10. The system of claim 1, wherein the connection is one of a cellular voice connection, a cellular data connection, a wired Internet connection, and a wireless Internet connection.

11. The system of claim 1, wherein at least one of the connection metrics is selected from connection setup time, connection signal strength, and mobile device location.

12. The system of claim 1, wherein at least one of the application metrics is selected from time from application initiation to ready for input, CPU usage during launch, CPU usage at ready for input, and active memory usage.

13. The system of claim 1, wherein the means of communication set forth in the certification program comprises a voice call using a telephony network.

14. The system of claim 1, wherein the means of communication set forth in the certification program is a VoIP call using a packet data network.

15. The system of claim 1, wherein the means of communication set forth in the certification program is a video call.

16. A method for automated mobile device performance certification for contact centers, comprising the steps of:
    storing a plurality of mobile device certification initiation commands in a mobile device command repository, each certification initiation command being configured to cause a wireless mobile device to initiate a test of its performance related to a connection with a contact center system;
    retrieving a mobile device certification initiation command from the mobile device command repository;
    connecting to a wireless mobile device;
    sending the mobile device certification initiation command to the wireless mobile device;
    executing, on the wireless mobile device, a certification program corresponding to the certification initiation command by:
        establishing a connection with a contact center via a means of communication set forth in the certification program;
        recording one or more connection metrics associated with the connection;
        opening and running a contact center support application on the wireless mobile device; and
        recording one or more application metrics associated with the opening and running of the contact center support application; and
    comparing the performance result with a performance standard; and
    certifying the mobile device for the contact center if the performance result complies with the performance standard.

* * * * *